(12) United States Patent
Johannesen et al.

(10) Patent No.: US 10,179,299 B2
(45) Date of Patent: Jan. 15, 2019

(54) SYSTEM FOR FLUID REDISTRIBUTION

(71) Applicant: STATOIL PETROLEUM AS, Stavanger (NO)

(72) Inventors: Eivind Johannesen, Trondheim (NO); Carl Birger Jenssen, Trondheim (NO); Pablo Matias Dupuy, Hommelvik (NO)

(73) Assignee: STATOIL PETROLEUM AS, Stavanger (NO)

( * ) Notice: Subject to any disclaimer, the term of this patent is extended or adjusted under 35 U.S.C. 154(b) by 181 days.

(21) Appl. No.: 15/106,531

(22) PCT Filed: Dec. 20, 2013

(86) PCT No.: PCT/EP2013/077830
§ 371 (c)(1),
(2) Date: Jun. 20, 2016

(87) PCT Pub. No.: WO2015/090476
PCT Pub. Date: Jun. 25, 2015

(65) Prior Publication Data
US 2016/0332090 A1    Nov. 17, 2016

(51) Int. Cl.
*B01D 3/32* (2006.01)
*B01D 3/00* (2006.01)
*B01D 3/20* (2006.01)

(52) U.S. Cl.
CPC .............. *B01D 3/008* (2013.01); *B01D 3/20* (2013.01); *B01D 3/32* (2013.01)

(58) Field of Classification Search
CPC ............. B01D 3/008; B01D 3/20; B01D 3/32

USPC ..................................... 261/96, 97, 109, 110
See application file for complete search history.

(56) References Cited

U.S. PATENT DOCUMENTS

| | | | | |
|---|---|---|---|---|
| 3,290,024 A | * | 12/1966 | Huber | B01D 3/008 261/111 |
| 4,314,972 A | * | 2/1982 | Nakane | B01D 3/20 261/114.2 |
| 4,427,605 A | * | 1/1984 | Meier | B01D 3/20 202/158 |
| 4,689,183 A | | 8/1987 | Helms et al. | |

(Continued)

FOREIGN PATENT DOCUMENTS

| | | |
|---|---|---|
| DE | 100 34 902 A1 | 2/2002 |
| EP | 1 800 725 A1 | 6/2007 |

(Continued)

*Primary Examiner* — Charles S Bushey
(74) *Attorney, Agent, or Firm* — Birch, Stewart, Kolasch & Birch, LLP

(57) ABSTRACT

A combined fluid collector and redistributor for a process engineering column, including a fluid collector for collecting a first fluid; a fluid redistributor arranged below the fluid collector to define a space between the fluid collector and the fluid redistributor; at least one pipe passing through the space to connect the fluid collector to the fluid redistributor; and at least one conduit extending through the fluid collector to permit a second fluid to flow through the fluid collector. There is at least one deflector in the space, wherein the at least one deflector is set at an angle relative to a central axis of the device whereby flow of the second fluid within the space is displaced angularly around the central axis.

22 Claims, 8 Drawing Sheets

(56) References Cited

U.S. PATENT DOCUMENTS

| | | | | |
|---|---|---|---|---|
| 5,145,612 A * | 9/1992 | Reay | ............... | B01D 3/008 261/79.2 |
| 5,554,346 A * | 9/1996 | Perry | ............... | B01D 3/20 261/97 |
| 5,567,396 A * | 10/1996 | Perry | ............... | B01D 3/20 239/146 |
| 5,897,748 A * | 4/1999 | Kaibel | ............... | B01D 3/008 196/111 |
| 6,286,818 B1 * | 9/2001 | Buhlmann | ............... | B01J 19/30 261/110 |
| 6,907,751 B2 * | 6/2005 | Kalbassi | ............... | B01D 19/0047 202/158 |
| 7,052,000 B2 * | 5/2006 | Zich | ............... | B01D 3/008 261/112.2 |
| 8,118,284 B2 | 2/2012 | Alzner et al. | | |
| 8,191,870 B2 | 6/2012 | Nieuwoudt et al. | | |
| 9,168,494 B2 * | 10/2015 | Chretien | ............... | B01D 3/008 |
| 2001/0038155 A1 | 11/2001 | Bachmann et al. | | |
| 2002/0041040 A1 | 4/2002 | Fischer et al. | | |
| 2002/0079597 A1 * | 6/2002 | Bartlok | ............... | B01D 3/008 261/97 |
| 2007/0163871 A1 | 7/2007 | Delatour | | |
| 2007/0272326 A1 | 11/2007 | Fehr et al. | | |
| 2012/0118399 A1 | 5/2012 | Binkley et al. | | |
| 2012/0175792 A1 | 7/2012 | Nieuwoudt | | |
| 2013/0204066 A1 | 8/2013 | Chretien | | |

FOREIGN PATENT DOCUMENTS

| | | |
|---|---|---|
| GB | 1 265 188 | 3/1972 |
| RU | 2491112 C2 | 9/2012 |

\* cited by examiner

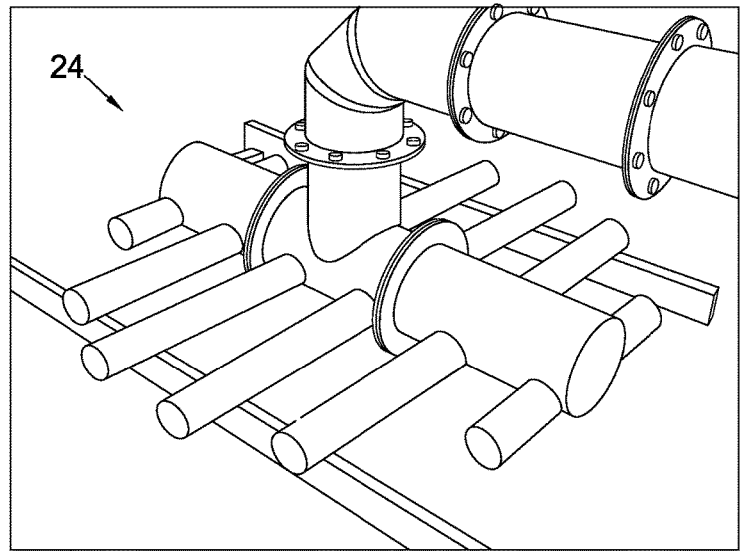
Figure 1a
Prior Art
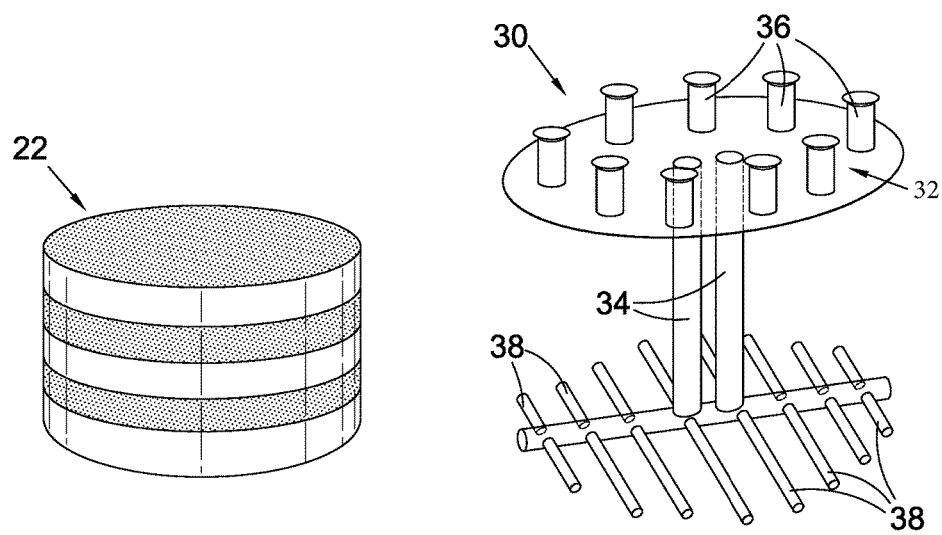
Figure 1b
Prior Art
Figure 1c
Prior Art

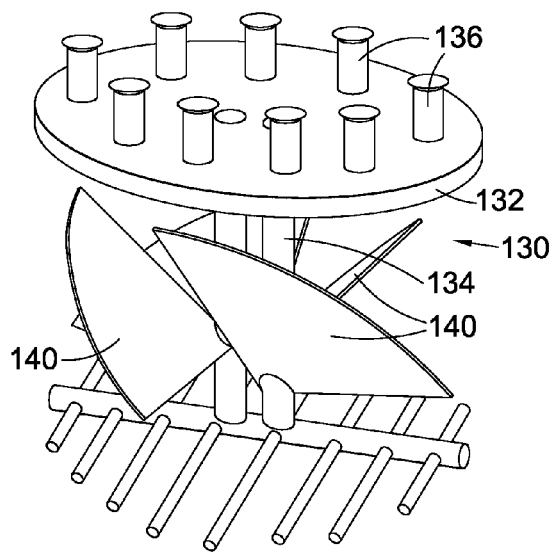
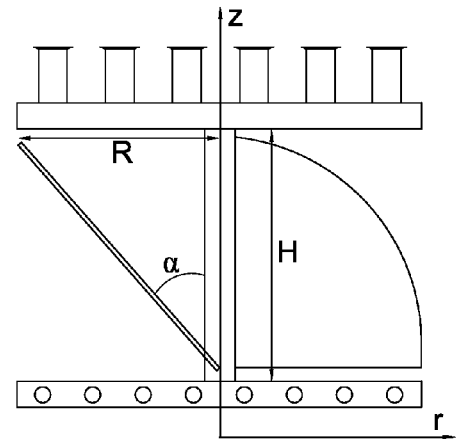
Figure 2c
Figure 2d
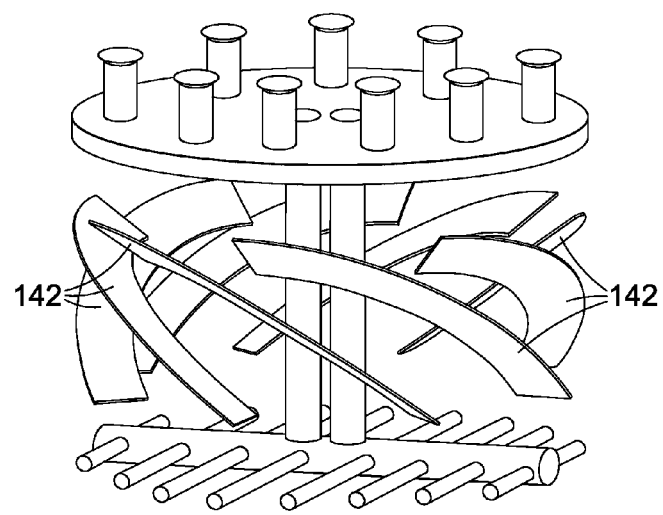
Figure 3

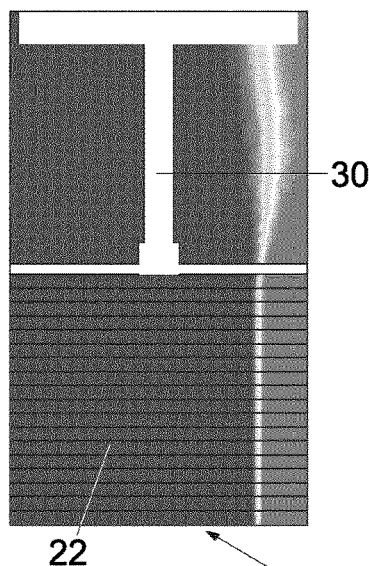
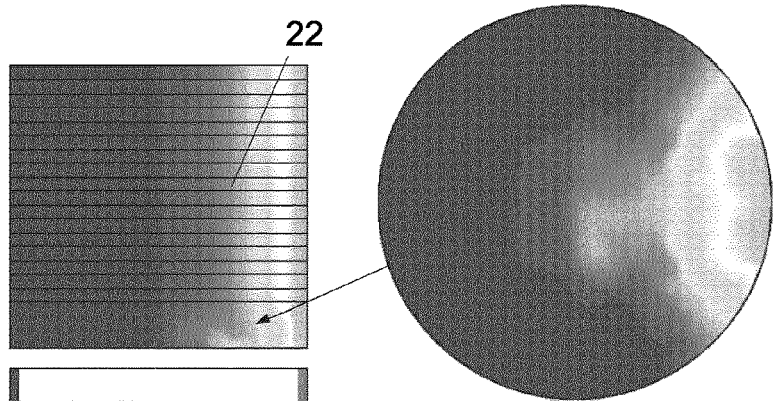
Figure 4b
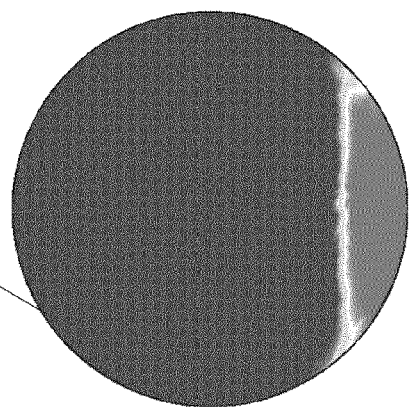
Figure 4a
Figure 4c

SYSTEM FOR FLUID REDISTRIBUTION

TECHNICAL FIELD

The invention relates to a system for fluid collection and redistribution, for example in process-engineering columns such as a gas-liquid contactor column or a distillation column.

BACKGROUND ART

Columns in which a light fluid such as a gas are contacted with a heavier fluid (e.g. liquid) are well known in the art. For example, US2013/0204066 describes a unit for establishing contact between a liquid and a gas which may be used for washing natural gas to extract acid compounds or for drying gas by contacting it with a hydroscopic liquid. US 2012/0118399 describes a process column in which a heavier fluid interacts with a lighter fluid; the column may be a distillation column. US2007/0272326 describes a fractionation column and US2002/0041040 describes a counterflow column. A generic term for such columns may be a process engineering column.

FIGS. 1 and 1d are schematic illustrations of two examples of a state of the art gas-liquid contactor column which may be a carbon dioxide absorber, a distillation column or another similar device. The column of FIG. 1 comprises fluid collectors and redistributors which are particularly suited to off-shore locations in which the column may tilt. If the column were located onshore; simpler fluid collectors and redistributors may be used.

Referring to FIG. 1, a first fluid which may be a liquid is input through a first input 10 which is positioned towards the top of the column. For example, in a carbon dioxide absorber column, the liquid is a solvent (e.g. water and one or more amines) which is suitable for absorbing carbon dioxide. The first input 10 is connected to a fluid distributor 24 an example of which is shown in more detail in FIG. 1a. The fluid distributor 24 is well known in the art and is not described in detail. However, as is clearly shown the fluid distributor comprises a plurality of distribution pipes for evenly distributing the fluid across the cross-section of the column. The fluid then flows downwards through the column through upper packing 22 which is shown in more detail in FIG. 1b. Again, the use of such packing is well known in the art and is not described in detail. The packing may comprise a plurality of layers and may be structured or random. As shown in FIG. 1, two packing beds are used but more packing beds may be used, for example three as shown in FIG. 1d. For example, for carbon-dioxide removal in a floating natural gas (FLNG) or floating production storage and offloading (FPSO) vessel, use of three packing beds is typical.

A second fluid which is lighter than the first fluid and may be a gas is input through a second input 12 which is positioned towards the bottom of the column. For example, in a carbon dioxide absorber column, the second fluid is a gas where carbon dioxide is an impurity which has to be removed. The second fluid rises through the column through another packing bed 22 (lower packing) which may be same as that used below the fluid distributor 24.

The first fluid which has passed through the distributor 24 and the packing 22 falls on to the collector tray of a fluid collector and redistributor 30 which is shown in more detail in FIG. 1c. The redistributor 30 comprises a fluid collection plate 32. The level of fluid on the upper surface of the plate 32 is schematically illustrated by line 20 (in FIG. 1). The second fluid (e.g. gas) which has risen through the column through lower packing 22 passes through chimneys 36 in the collection plate 32. The chimneys 36 pass through the collection plate 32 and are sufficiently tall that the light fluid is output above the level of fluid on the collection plate 32. In this way, there is no contact or interaction between first and second fluids on the collection plate.

The fluid collector and redistributor 30 also comprises at least one (possibly two or more) downcomer pipes 34 through which the heavier fluid passes from the collection plate. The downcomer pipes 34 are connected to a fluid distributor 38. The downcomer pipes 34 may be several meters long and thus there may be a large gap between the collection plate 32 and the fluid redistributor 38. The use of the downcomer pipes to channel the heavier fluid ensures that there is no interaction between the heavier fluid and the gas in the gap between the collection plate or anywhere within the fluid collector and redistributor 30. In this case, the fluid distributor is a branched distributor which comprises a plurality of branches for uniformly distribution of the fluid across the cross-section of the column.

Returning to FIG. 1-1d, the heavier fluid flows down from the distributor 38 through lower packing 22 to collect in a fluid sump 18 at the bottom of the column. The first fluid will interact with the second fluid as it rises through the lower packing 22, e.g. to absorb carbon dioxide. The first fluid, e.g. the solvent which has absorbed the carbon dioxide from the second fluid, is then removed from the column by first fluid output 16 located at the base of the column. Similarly, the first, heavier fluid will interact with the second, lighter fluid as it rises through the upper packing 22, e.g. to absorb carbon dioxide before the first fluid hits the collection plate. Fluid then flows out through a second fluid output 14 located at the top of the column. For example, in a carbon dioxide absorber column, the treated gas is drawn off from the second fluid output. A meshpad 11 may be provided over the second fluid output 14.

Many of these process engineering columns are on a floating production facility, for example a floating natural gas (FLNG) or floating production storage and offloading (FPSO) vessel. One problem is that the columns are affected by tilt and motion of the floating facility. This problem is recognised in the prior art, for example in U.S. Pat. No. 8,118,284, which explains how the heavy fluid may not be uniformly distributed to the packing below the redistributor under tilted and moving conditions. U.S. Pat. No. 8,118,284 describes a pressure distributor which is designed to address this problem. However, the present applicant has recognised the need for further improvement of the redistributor for use in columns which are likely to tilt or move.

SUMMARY OF THE INVENTION

According to a first aspect of the invention, there is provided a combined fluid collector and redistributor for a process engineering column, comprising
  a fluid collector for collecting a first fluid;
  a fluid redistributor arranged below said fluid collector to define a space between said fluid collector and said fluid redistributor;
  at least one pipe passing through said space to connect said fluid collector to said fluid redistributor;
  at least one conduit extending through said fluid collector to permit a second fluid to flow through said fluid collector; and
  a plurality of deflectors in said space;

wherein said combined fluid collector and redistributor has a central axis and wherein each deflector is set at an angle relative to the central axis whereby flow of said second fluid within said space is displaced angularly around the central axis.

The combined fluid collector and redistributor of the present invention is particularly useful for a process engineering column which is not mounted on a fixed platform, i.e. a column which is subject to tilting. Thus according to another aspect of the invention, there is provided a process engineering column comprising a first inlet for a first fluid; a second inlet for a second fluid which is lighter than said first fluid and a combined fluid collector and redistributor as described above. Said first inlet is generally near the top of said process engineering column; said second inlet is near the bottom of said process engineering column and said combined fluid collector and redistributor is between said first and second inlets. Typically, both the column and the fluid collector and the redistributor of the combined fluid collector and redistributor have a generally circular cross-section. The axis of the combined fluid collector and redistributor passes through the centre of the cross-section and is parallel, preferably coincident, to the axis of the column.

In the present invention, the deflectors adjust the flow of the second fluid, which may be a gas flowing upwards through the column in order to improve the performance of a tilted/moving column. This is particularly useful for a permanently tilted column as explained in more detail below. Without angular displacement of the second fluid relative to the axis of the combined fluid collector and the redistributor and hence the axis of the column, concentration differences in the plane normal to the axis of the column, once created, will persist throughout most of the column height. By contrast the known solution have focussed on the distribution and circulation of the first fluid within the column, e.g. by using branched distributors to ensure an even distribution of the fluid across the cross-section of the column or the pressure distributor of U.S. Pat. No. 8,118,284. However, circulation of the first fluid and good distribution/redistribution only address the problem if the tilt is about 1 degree or less.

The following statements apply to both aspects of the invention.

The second fluid is a lighter fluid, typically a gas, and rises due to pressure difference between the inlet 12 and the outlet 14. Accordingly, the second fluid always flows generally parallel to the axis of the column even if the column is tilted. The first fluid is a heavier fluid, typically a liquid, and flows vertically downwards due to gravity. Thus, when the column is tilted, the downward flow is still vertical but ceases to be parallel to the axis of the column (i.e. parallel to the axis of the combined fluid collector and redistributor). Accordingly, there is no longer a uniform flow across the cross-section of the column. Furthermore, in the parts of the column in which less of the first fluid is flowing, more of the second fluid will flow because of less flow resistance in this part of the column. The tilt is particularly problematic for the rising flow because the uneven gradients can persist even after the tilt is reduced or changed. Given the length of the columns (several meters), such uneven flow may thus prevail over a large height.

The process engineering column typically further comprises at least one packing bed which in use is wetted by the first fluid for interaction with the second fluid. However, when the column is tilted there may be a portion of the packing bed which is not wetted by the first fluid. The maximum width w of the unwetted portion may be defined as:

$$w = H \tan \alpha$$

where H is the height of the packing bed and $\alpha$ is the tilt angle. H may be several meters and thus a small tilt angle may result in a relatively large unwetted portion. If the second fluid flows through this unwetted portion, there is no interaction between the two fluids and thus this unwetted portion may be termed a bypass area. The lack of, or uneven, interaction of the two fluids will change the composition of the output from the column so that in the worst case, the output does not meet the product specifications and the column has to be shut down.

In the present invention, the deflectors displace the second fluid angularly as it passes through the combined collector and redistributor and thus any gradients which have been introduced as a result of tilting are reduced or eliminated. The purpose of the angular displacement of the second fluid is to transfer fluid that has passed through an unwetted region (i.e. a region with a low amount of the first fluid also known as a region of low activity) in the of packing below the combined fluid collector and redistributor to a wetted region (i.e. a region with a high amount of the first fluid) in the packing above the combined fluid collector and redistributor, and vice versa. The amount of angular displacement may be related to the number of packing beds which are present in the column and may be selected such that the second fluid passes once, and only once, through a region of low activity. For a column with two beds, the angular displacements may be 180°, for three beds 120°, and so on. For a column with N beds, the desired angular displacement between each bed could be M*360/N, where M is a positive integer. For columns with more than four beds, it might be advantageous or necessary to direct the second liquid more than once through a region of low activity. The angular displacement may be between 90° and 180°.

The deflectors may be in the form of plates, baffles, vanes, or similar devices. The properties, e.g. the shape, size, and/or angle of the deflectors may be designed or selected to provide the desired amount of angular displacement. The plurality of deflectors may be further arranged to block flow of said second fluid through a section of said collector when said combined fluid collector and redistributor is tilted. For example, the deflector may be shaped so that a portion of the deflector aligns with the bypass area when in use and the column is tilted. The deflectors may also be designed to obtain the required structural integrity within the space. The properties of the deflectors, for example the angle with respect to said axis may be determined by calculations, e.g. computational fluid dynamics (CFD), or experiments to obtain the desired angular displacement of the second fluid. The deflectors may be planar or curved.

There may be any number of deflectors, e.g. between four and eight. The shape of each deflector may be designed to further disrupt the flow of the second fluid, e.g. by comprising at least one curved edge. For example, where there are four deflectors, each deflector may be quadrant shaped. Alternatively, there may be eight deflectors which may be generally arcuate.

Said at least one pipe may be substantially centrally located on said fluid collector whereby the axis of the column and the at least one pipe are parallel or possibly the same in use. There may be a plurality of pipes, e.g. two. The plurality of deflectors may be evenly spaced around said at least one pipe. Each deflector may be fixed to the pipe.

Each deflector is preferably static; disruption to the air flow is caused by the shape, size and/or angle of the deflector. It will be appreciated that the shape of each deflector needs to balance the competing requirements of providing sufficient angular displacement to the fluid flow without blocking too much of the fluid flow.

The column may further comprise a fluid distributor for said first fluid, wherein said fluid distributor is located above said combined fluid collector and redistributor. The fluid distributor and the distributor within the combined fluid collector and redistributor may be designed to distribute fluid evenly across the cross-section of the column. Each may be a branched distributor as is known in the art. The fluid collector may have any form as is known in the art. The fluid collector may be a generally planar plate or may be shaped/angled to promote flow into the at least one pipe.

The combined fluid collector and redistributor is preferably shaped to be a tight fit within the column.

BRIEF DESCRIPTION OF THE DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

FIG. 1a is a schematic illustration of a component within the column of FIG. 1;

FIGS. 1b and 1c are perspective views of other components within the column of FIG. 1;

FIG. 2c is a schematic view of a combined fluid collector and distributor for use in the column of FIG. 2;

FIG. 2d is a schematic cross-section of the combined fluid collector and distributor of FIG. 2c;

FIG. 3 is a perspective view of an alternative combined fluid collector and distributor for use within the column of FIG. 2;

FIG. 4a is a cross-section showing the concentration of a tracer which represents untreated lighter fluid (e.g. gas) within a column such as that shown in FIG. 1 or 1d;

FIGS. 4b and 4c are cross-sections across the column of FIG. 4a;

FIGS. 5b and 5c are cross-sections across the column of FIG. 5a.

DETAILED DESCRIPTION OF THE DRAWINGS

Figure 1:
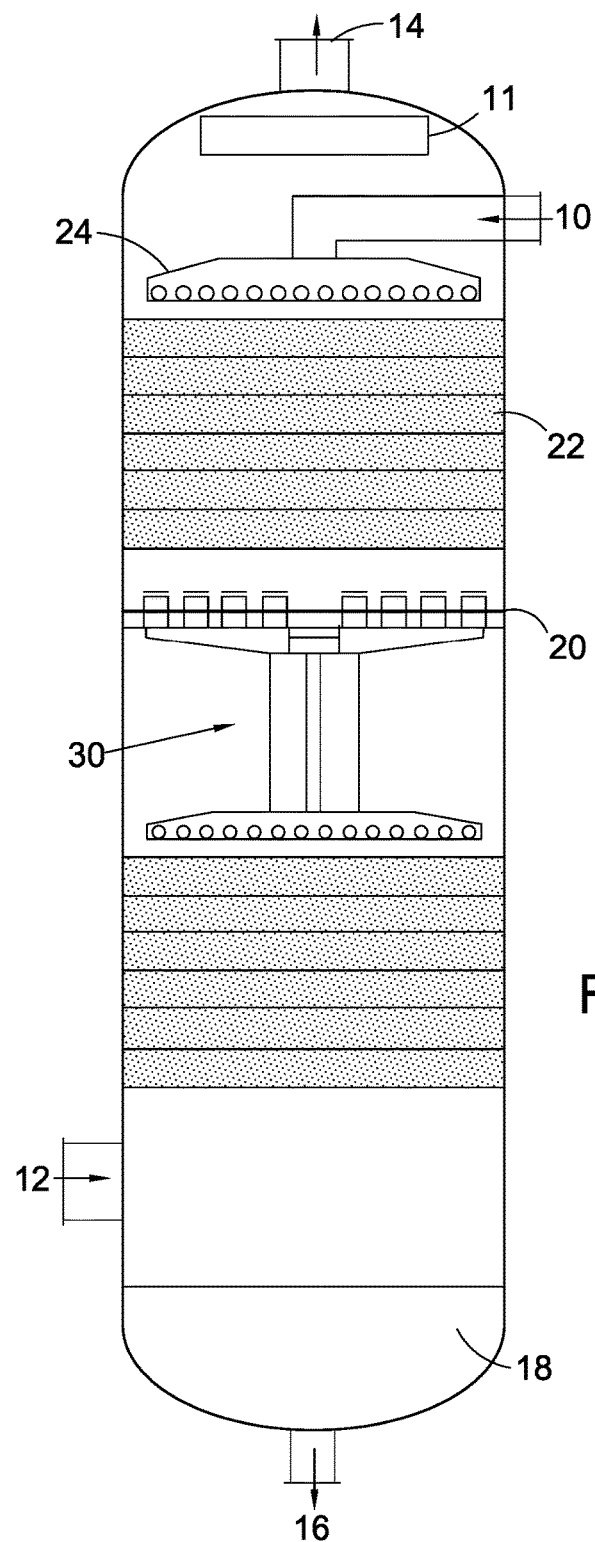
FIG. 1 is a schematic cross-section of a contactor column according to the state of the art.
Figure 1D:
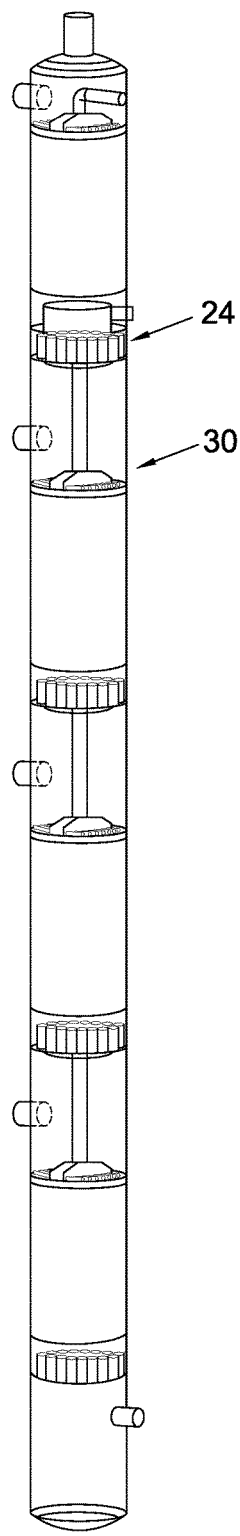
FIG. 1d is a schematic view of a second contactor column according to the state of the art.
Figure 1E:
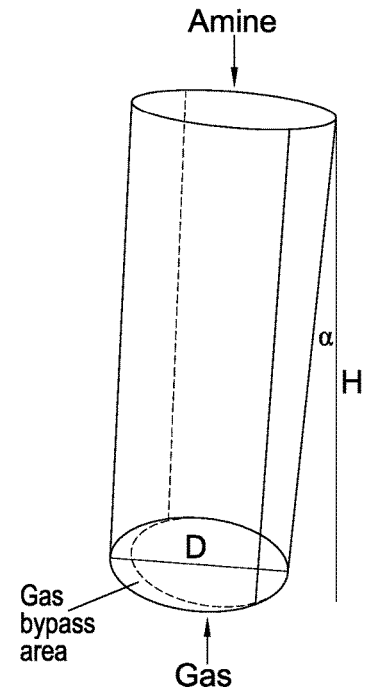
FIGS. 1e to 1g are schematic perspective, cross-section and plane views of a section of a tilted column.
Figure 1F:
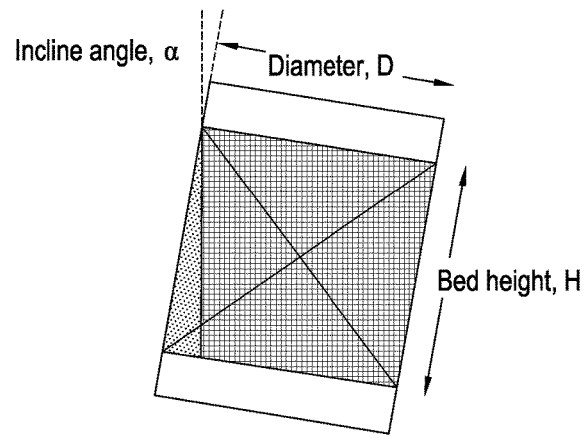
Figure 1G:
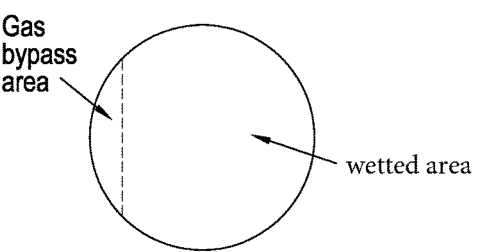

FIGS. 1e to 1g schematically illustrate a problem with columns on floating facilities (or other unstable facilities) in which the column may tilt. FIGS. 1e and 1f illustrate a section of the column, for example, the packing bed below the redistributor and FIG. 1g is a cross-section through FIG. 1f at the base of the bed. The height of the section is H, the diameter of the column is D and the incline angle is α. The first heavier fluid (e.g. solvent) flows vertically downwards through the column due to gravity. By contrast, the second lighter fluid flows generally parallel to the axis of the column because it is pressure drop through the column which governs the flow of the second fluid (e.g. gas). If the column is tilted, there is a portion of the packing (illustrated in dots) through which no heavy fluid flows and is therefore not wet. This unwetted portion may be known as a region of low activity because there is little (or none) of the first fluid to interact with the second fluid. As shown in FIG. 1e, the portion through which no heavier fluid flows has a generally crescent shape at the lower surface of the packing bed. In FIG. 1g, this is shown as an arc shape. The maximum width w of the unwetted portion is defined as:

$$w = H \tan \alpha$$

As set out above, H may be several meters and thus a small tilt angle may result in a relatively large unwetted portion. It is noted that permanent tilt is not normally more than 2 to 3 degrees but the tilt can oscillate up to 10 degrees. There is nothing preventing a portion of the rising fluid passing through this unwetted packing. Any such rising fluid will therefore not meet sufficient falling fluid. Moreover, because no heavier fluid is falling through this section, it is easier for the lighter fluid to rise therethrough. Thus, this unwetted portion may be termed a bypass area (gas bypass area if the second fluid is a gas). If the bypass area is too large, product specifications for fluid drawn from the top and bottom of the column may not be met.

The long length and also large diameter of the columns can thus result in a large gas bypass area. Such columns will thus have significant concentration differences over the cross-section of the column in the tilted and moving conditions. Once created, these concentration gradients in the gas phase prevail throughout a large part of the column height, even if the tilt changes or is removed. One known method for solving this problem is to significantly increase design margins on the column height, diameter and/or first fluid throughput. The worst case scenario is that the design margins are insufficient to meet the production specifications once production has started, leading to production losses and costly downtime for modifications.

Figure 2:
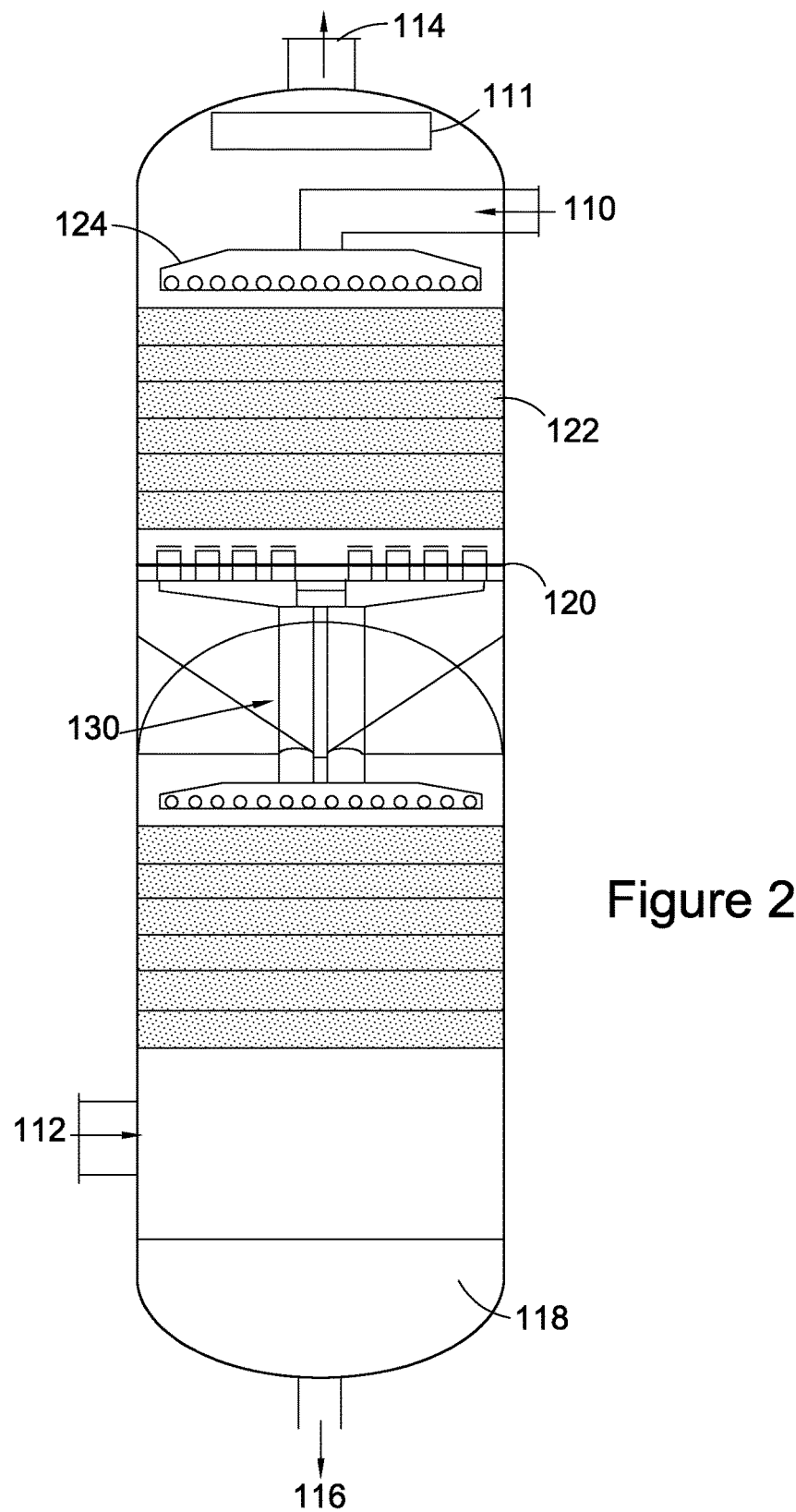
FIG. 2 is a schematic cross-section of a contactor column according to the invention.

FIG. 2 illustrates a column in which the above problem is addressed by using a physical element which moves the second fluid, e.g. the gas. As explained in more detail below, this ensures that any gradients which are created by tilting cannot prevail throughout the entire column and in particular when the second fluid is about to pass through the chimneys in the collection plate.

Like FIG. 1, FIG. 2 is a schematic illustration of a gas-liquid contactor column which may be a carbon dioxide absorber, a distillation column or another similar processing engineering column. Many of the components in FIG. 1 are the same as those used in FIG. 2; only the combined fluid collector and redistributor is changed and this is described in more detail with reference to FIG. 2c.

Figure 2A:
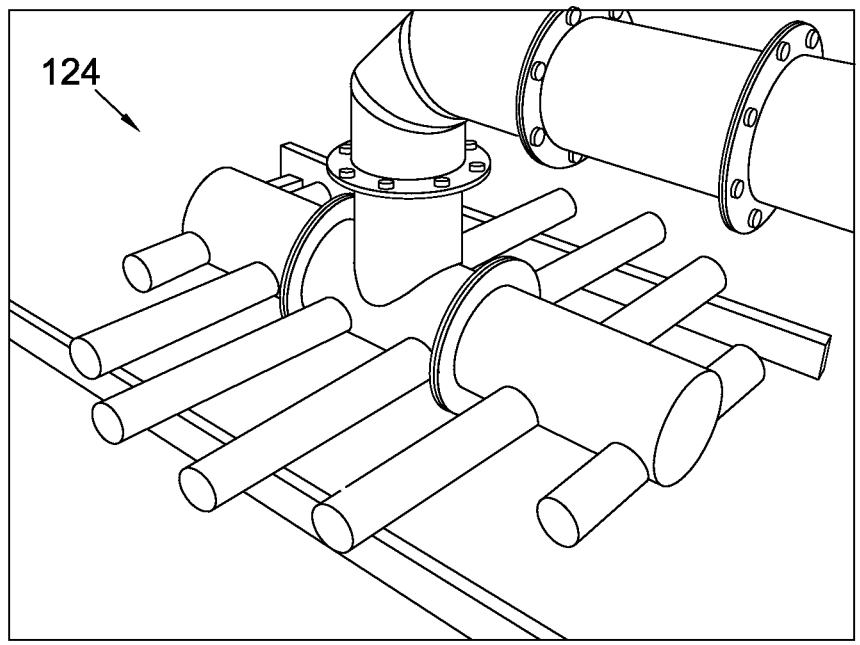
FIGS. 2a and 2b are perspective views of components within the column of FIG. 2.
Figure 2B:
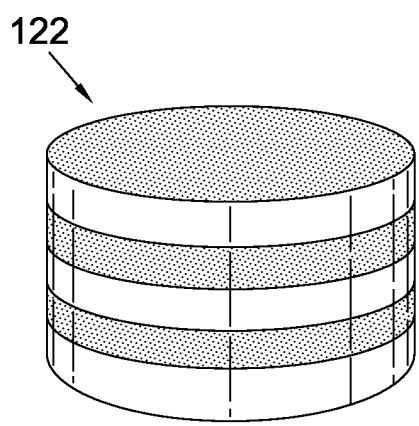

FIG. 2 shows that a first fluid which may be a liquid is input through a first input 110 which is positioned towards the top of the column. The first input 110 is connected to a fluid distributor 124 which is shown in more detail in FIG. 2a and is the same as that shown in FIG. 1a. The fluid distributor 124 comprises a plurality of distribution pipes for evenly distributing the first fluid across the cross-section of the column. The first fluid then flows downwards through the column through upper packing 122 which is shown in more detail in FIG. 2b. Again, the packing is the same as that shown in FIG. 1b. It will be appreciated that the fluid distributor and upper packing may be replaced or removed depending on the nature of the process engineering column.

FIG. 1 also shows that a second fluid which is lighter than the first fluid and may be a gas is input through a second input 112 which is positioned towards the bottom of the column. The second fluid rises through the column through another packing bed 122 which may be same as that used below the distributor 124. This lower packing 122 may also be removed or replaced with another component depending on the nature of the process engineering column.

The first fluid which has passed through the distributor 124 and the upper packing 122 falls on to the collector tray of a combined fluid collector and redistributor 130 which is shown in more detail in FIG. 2c. Fluid flows down from the redistributor 130 through lower packing 122 to collect in a fluid sump 118 at the bottom of the column. This collected fluid is drawn off through a first fluid output 116. Lighter fluid rises through the column and flows out through a second fluid output 114. A meshpad 111 may be provided over the second fluid output 114.

FIGS. 2c and 2d shows the detail of the combined fluid collector and redistributor 130. As in FIG. 1c, the redistributor 130 comprises a collector in the form of a fluid collection plate 132. The second fluid (e.g. gas) which has risen through the column through lower packing 122 passes through a plurality of chimneys 136 in the collection plate 132. As in the embodiment of FIG. 1c, the openings for the chimneys 136 are covered, e.g. with "hats", to prevent the heavier fluid raining into the chimneys. Moreover, the height of the chimneys is sufficiently large to ensure that there is minimal (if any) interaction between the two fluids on the collection plate 132. Similarly, the redistributor 130 comprises one (possibly more) downcomer pipe 134 through which fluid passes to a fluid distributor 138. Thus, the downward flowing fluid is prevented from interacting with the rising fluid in the space between the collector and the redistributor. These pipe(s) are generally centrally located relative to the redistributor and the collector. In this case, the fluid distributor is a branched distributor which comprises a plurality of branches for uniformly distributed the combined fluid across the cross-section of the column. However, any suitable distributor may be used. The collection plate 132 is shown as generally planar in FIG. 2 but it may angled and/or sloped to promote flow into the downcomer pipes.

Merely for illustration, the typical height for such a combined collector and redistributor is up to 5 m and the typical diameter is up to 5 m. The present invention can be used independent of the size, but it will be most advantageous for the larger diameter columns with tall redistributors. Concentration differences in the plane vertical to the column axis are most challenging for larger diameter columns, and under severe tilt/movement conditions where a tall redistributor is required.

There is a gap or space between the fluid distributor and the collector. As shown in FIG. 2d, this gap has a height H and a radius of R (which corresponds to the radius of the column). The fluid distributor and the collector fit into a substantially circular column and are thus both generally circular. The combined collector and redistributor is centrally mounted within the column and has a central axis z which is substantially coincident with the central axis of the column. The radial direction is denoted as r.

In the example of FIG. 2c, four deflectors 140 are positioned between the fluid distributor 138 and the fluid collection plate 132. These deflectors 140 have a generally quadrant shape, in other words they have two generally straight edges connected by a curved edge. The length of one straight side of the plates can be approximately R and the other H, while the length of the curved side is approximately H/cos α. The deflector 140 may be truncated on one side to ensure a better fit. The curvature of the curved edge matches that of the column and is adjacent an inner face of the column. The shape is such that if the deflectors 140 were arranged at right angles to the axis of the column they would form a plate or cover which would prevent second fluid rising. The deflectors 140 are equally spaced around the axis of the combined collector and redistributor. The deflectors 140 are positioned at an angle of approximately 45 degrees to the axis of the column; in other words at an angle of approximately 45 degrees to the plane of the collection plate and/or the distributor. The deflectors 140 are fixed to the downcomer pipe in this arrangement but they may alternatively or additionally be fixed to the inner surface of the column. The deflectors may also be fixed to the fluid distributor 138. The deflectors 140 are static, i.e. they do not move.

FIG. 3 shows an alternative design for the fluid collector and redistributor which comprises eight deflectors 142. The deflectors 142 are generally arcuate with two curved edges. As in FIG. 2c, the deflectors 142 are set at an angle of angle of approximately 45 degrees to the plane of the collection plate 132 and/or the distributor 138 and are supported on the downcomer pipe 134.

FIGS. 4a to 5c illustrate the effect of including the deflectors such as those shown in FIGS. 2c and 3. FIGS. 4a to 4c show the flow through a column such as that shown in FIG. 1. A tracer is placed in the lighter fluid at the edge of column (in this case, the right hand side with the tracer showing the lighter fluid in pale grey). As shown in FIGS. 4a to 4c, the flow of the lighter fluid is largely undisturbed by the presence of the combined fluid collector and redistributor 30 which is between two packing beds 22. In other words, the tracked fluid generally flows straight up the side of the column. FIG. 4b shows that the concentration of the tracer is lower at the right side than in FIG. 4c. Thus, there is a small amount of deflection of the fluid as it rises through the column. However, the fluid is generally rising through the same portion of the column. Thus, if the column were tilted as explained above, with an unwetted portion at the right hand side of the column, the rising fluid would pass through two unwetted portions and would thus not interact with any of the falling fluid.

Figure 5B:
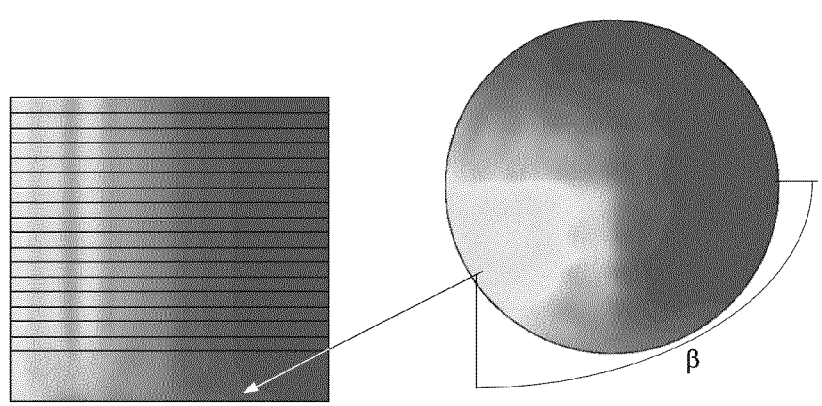
Figure 5A:
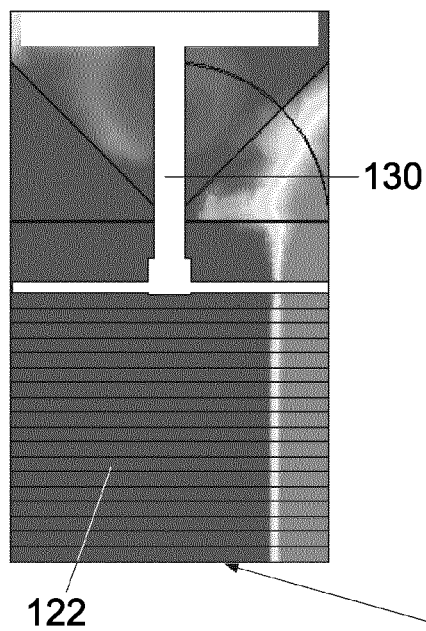
FIG. 5a is a cross-section showing the concentration of a tracer which represents untreated lighter fluid (e.g. gas) within a column such as that shown in FIG. 4.
Figure 5C:
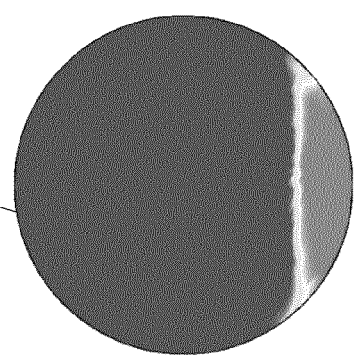

FIGS. 5a to 5c show the flow through a column such as that shown in FIG. 2. Again a tracer is placed in the lighter fluid at the edge of column. However, as shown in FIGS. 5a to 5c, the flow of the lighter fluid is displaced by an angle β of approximately 120 degrees around the central axis of the combined fluid collector and redistributor. The flow is displaced angularly by the deflectors in the combined fluid collector and redistributor 130 which is between two packing beds 122. As illustrated in FIG. 5b which is a cross-section at the base of the upper packing bed, the concentration of the tracer is highest in the area towards the left hand side of the column. By contrast, in FIG. 5c, the highest concentration of tracer is at the right hand side of the column. Thus, the second, rising fluid has been displaced by between 90 to 180 degrees, mostly about 120 degrees around the axis of the combined fluid collector and redistributor. Accordingly, if the column were tilted to the right hand side, the rising fluid would flow through an unwetted area in the lower packing bed but is then deflected or angularly displaced around the central axis to flow through a wetted area of the upper packing bed. Moreover, there will be a higher concentration of the falling fluid in the left hand side of such a tilted column. Thus, by the use of deflectors, the rising fluid is guaranteed to interact with the falling fluid, even if the column is tilted. Accordingly, overall product specifications will be improved.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A combined fluid collector and redistributor for a process engineering column, comprising
   a fluid collector for collecting a first fluid;
   a fluid redistributor arranged below said fluid collector to define a space between said fluid collector and said fluid redistributor;
   at least one pipe passing through said space to connect said fluid collector to said fluid redistributor;
   at least one conduit extending through said fluid collector to permit a second fluid to flow through said fluid collector; and
   at least one deflector in said space
   wherein said combined fluid collector and redistributor has a central axis and wherein said at least one deflector is set at an angle relative to the central axis whereby flow of said second fluid within said space is displaced angularly around the central axis.

2. The combined fluid collector and redistributor of claim 1, wherein the flow of said second fluid is displaced by between 90 to 180 degrees around the central axis.

3. The combined fluid collector and redistributor of claim 2, wherein the flow of said second fluid is displaced by approximately 120 degrees around the central axis.

4. The combined fluid collector and redistributor of claim 1, wherein said at least one deflector is set an angle of approximately 30 degree relative to the central axis.

5. The combined fluid collector and redistributor of claim 1, wherein the shape and/or size of the at least one deflector is selected to contribute to the displacement of the flow of said second fluid.

6. The combined fluid collector and redistributor of claim 1, comprising four deflectors.

7. The combined fluid collector and redistributor of claim 6, wherein each deflector is quadrant shaped.

8. The combined fluid collector and redistributor of claim 1 comprising eight deflectors.

9. The combined fluid collector and redistributor of claim 8, wherein each deflector is generally arcuate.

10. The combined fluid collector and redistributor of claim 1, wherein there are a plurality of deflectors which are evenly spaced around said at least one pipe.

11. The combined fluid collector and redistributor of claim 1, wherein the plurality of deflectors are arranged to block flow of said second fluid through a section of said collector when said combined fluid collector and redistributor is tilted.

12. A process engineering column comprising
    a first inlet for a first fluid;
    a second inlet for a second fluid which is lighter than said first fluid and
    the combined fluid collector and redistributor of claim 1;
    wherein said first inlet is near the top of said process engineering column; said second inlet is near the bottom of said process engineering column and said combined fluid collector and redistributor is between said first and second inlets.

13. The process engineering column according to claim 12, further comprising at least one packing bed.

14. The process engineering column according to claim 13, comprising N packing beds and wherein the flow of said second fluid is displaced by an angle defined by M*360/N, where M is a positive integer.

15. A process engineering column comprising
    a first inlet for a first fluid;
    a second inlet for a second fluid which is lighter than said first fluid and
    the combined fluid collector and redistributor of claim 2;
    wherein said first inlet is near the top of said process engineering column; said second inlet is near the bottom of said process engineering column and said combined fluid collector and redistributor is between said first and second inlets.

16. A process engineering column comprising
    a first inlet for a first fluid;
    a second inlet for a second fluid which is lighter than said first fluid and
    the combined fluid collector and redistributor of claim 3;
    wherein said first inlet is near the top of said process engineering column; said second inlet is near the bottom of said process engineering column and said combined fluid collector and redistributor is between said first and second inlets.

17. A process engineering column comprising
    a first inlet for a first fluid;
    a second inlet for a second fluid which is lighter than said first fluid and
    the combined fluid collector and redistributor of claim 4;
    wherein said first inlet is near the top of said process engineering column; said second inlet is near the bottom of said process engineering column and said combined fluid collector and redistributor is between said first and second inlets.

18. A process engineering column comprising
    a first inlet for a first fluid;
    a second inlet for a second fluid which is lighter than said first fluid and
    the combined fluid collector and redistributor of claim 5;
    wherein said first inlet is near the top of said process engineering column; said second inlet is near the bottom of said process engineering column and said combined fluid collector and redistributor is between said first and second inlets.

19. A process engineering column comprising
    a first inlet for a first fluid;
    a second inlet for a second fluid which is lighter than said first fluid and
    the combined fluid collector and redistributor of claim 6;
    wherein said first inlet is near the top of said process engineering column; said second inlet is near the bottom of said process engineering column and said combined fluid collector and redistributor is between said first and second inlets.

20. A process engineering column comprising
    a first inlet for a first fluid;
    a second inlet for a second fluid which is lighter than said first fluid and
    the combined fluid collector and redistributor of claim 7;

wherein said first inlet is near the top of said process engineering column; said second inlet is near the bottom of said process engineering column and said combined fluid collector and redistributor is between said first and second inlets.

21. The combined fluid collector and redistributor of claim 1, wherein each said conduit comprises a chimney having height sufficiently large to reduce interaction between the first fluid and the second fluid on the fluid collector.

22. The combined fluid collector and redistributor of claim 21, wherein each said chimney is covered to prevent the first fluid raining into the chimney.

* * * * *